US008456599B2

(12) United States Patent
Jeong et al.

(10) Patent No.: US 8,456,599 B2
(45) Date of Patent: Jun. 4, 2013

(54) DISPLAY SUBSTRATE HAVING IMPROVED PIXEL ELECTRODE CONFIGURATION AND DISPLAY DEVICE HAVING THE SAME

(75) Inventors: Youn-Hak Jeong, Cheonan-si (KR); Hee-Hwan Lee, Busan (KR); Keun-Chan Oh, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 682 days.

(21) Appl. No.: 12/629,861

(22) Filed: Dec. 2, 2009

(65) Prior Publication Data

US 2011/0013129 A1 Jan. 20, 2011

(30) Foreign Application Priority Data

Jul. 20, 2009 (KR) .................. 10-2009-0065773

(51) Int. Cl.
*G02F 1/1337* (2006.01)
*G02F 1/1343* (2006.01)

(52) U.S. Cl.
USPC .......................................... 349/141; 349/129

(58) Field of Classification Search
USPC ................................... 349/129, 141
See application file for complete search history.

(56) References Cited

U.S. PATENT DOCUMENTS

| 6,573,965 B1* | 6/2003 | Liu et al. ........................ 349/129 |
| 2007/0247579 A1 | 10/2007 | Cho et al. | |
| 2007/0291208 A1* | 12/2007 | Wang et al. .................... 349/129 |
| 2009/0086142 A1* | 4/2009 | Chen et al. ..................... 349/129 |
| 2009/0168003 A1* | 7/2009 | Liu et al. ........................ 349/129 |

FOREIGN PATENT DOCUMENTS

| JP | 2005-258194 | 9/2005 |
| JP | 2007-256989 | 10/2007 |
| JP | 2008-097049 | 4/2008 |
| JP | 2008-129050 | 6/2008 |
| KR | 10-2008-0096943 A | 11/2008 |
| KR | 10-2008-0100027 A | 11/2008 |
| KR | 10-2009-0013373 A | 2/2009 |
| KR | 10-2009-0017228 A | 2/2009 |

* cited by examiner

*Primary Examiner* — Huyen Ngo
(74) *Attorney, Agent, or Firm* — Innovation Counsel LLP

(57) ABSTRACT

A display substrate includes a switching element and a pixel electrode. The pixel electrode is electrically connected to the switching element. The pixel electrode includes a plurality of slit electrodes that are conductive elements respectively disposed in a plurality of domains oriented substantially parallel to each other and extending substantially in a first direction. The slit electrodes each extend in a direction different from the first direction. Each slit electrode is an elongated structure having first and second long sides, and first and second short sides positioned opposite to each other and each extending between the first and second long sides, where the first long side oriented at an angle with respect to the first direction that is different from that of the second long side. Thus, a plurality of domains is formed, so that generation of texture may be decreased and compensating efficiency may be enhanced.

14 Claims, 11 Drawing Sheets

DISPLAY SUBSTRATE HAVING IMPROVED PIXEL ELECTRODE CONFIGURATION AND DISPLAY DEVICE HAVING THE SAME

PRIORITY STATEMENT

This application claims priority under 35 U.S.C. §119 to Korean Patent Application No. 2009-65773, filed on Jul. 20, 2009 in the Korean Intellectual Property Office (KIPO), the contents of which are herein incorporated by reference in their entirety.

BACKGROUND

1. Field of the Invention

Example embodiments of the subject matter described herein relate to a display substrate and a display device having the display substrate. More particularly, example embodiments relate to a display substrate for a display device having high visibility and high transmittance and a display device having the display substrate.

2. Description of the Related Art

Generally, a display device includes a liquid crystal display (LCD) device displaying images by using light transmittance of liquid crystal. The LCD device includes an LCD panel displaying images and a backlight assembly disposed below the LCD panel to provide the LCD panel with light.

The LCD panel includes a display substrate, a substrate opposite the display substrate, and a liquid crystal layer disposed between the display substrate and the opposite substrate.

The LCD device may be driven in various modes in accordance with liquid crystal molecules of the liquid crystal layer.

That is, the LCD device may be operated in a vertical alignment (VA) mode in a long axis of liquid crystal molecules, which is vertically aligned with respect to a display substrate, at a condition when voltage is not applied thereto, a patterned vertical alignment (PVA) mode having a superior viewing angle and a superior contrast ratio (CR) than the VA mode, a super vertical alignment (SVA) mode having a superior aperture ratio than the PVA mode and the VA mode, etc.

Particularly, the SVA mode has been developed to solve demerits such as visibility distortion of the VA mode. In the SVA mode, one pixel area is divided into a high pixel and a low pixel for compensating the visibility distortion of the high pixel, so that the low pixel compensates the visibility of the high pixel.

However, in the SVA mode, a domain of the low pixel for compensating a visibility distortion of the high pixel is far from a domain of the high pixel, so that a compensation efficiency of the low pixel compensating the visibility distortion may be decreased.

SUMMARY

Example embodiments provide a display substrate suitable for a display device having superior visibility and superior transmittance.

Example embodiments also provide a display device having the above-mentioned display substrate.

According to one aspect, a display substrate includes a base substrate, a switching element, and a pixel electrode. The switching element is formed on the base substrate. The pixel electrode is electrically connected to the switching element. The pixel electrode includes a plurality of slit electrodes respectively disposed on a plurality of domains in parallel defined in a first direction. The slit electrodes are extended in a direction different from the first direction. A slope of a first long side of the slit electrodes is different from that of a second long side opposite to the first end side of the slit electrode.

In an example embodiment, the pixel electrode may further include a connection electrode disposed in correspondence with a boundary of the domains to be connected to the slit electrode.

In an example embodiment, the connection electrode may include a protrusion electrode protruded in an area between the slit electrodes to control a direction of liquid crystal molecules.

In an example embodiment, the pixel electrode may be defined as a plurality of domain groups. An m-th domain and an (m+1)-th domain ('m' is an odd number) may be included in each of the domain groups. An m-th slit electrode and an m-th interval portion defined by the m-th slit electrode may be formed on the m-th domain. An (m+1)-th slit electrode extended in a direction different from a direction of the m-th slit electrode and an (m+1)-th interval portion defined by an (m+1)-th slit electrode may be formed on the (m+1)-th domain.

In an example embodiment, the slit electrodes disposed on a first domain group of the domain groups may be symmetric to the slit electrodes disposed on a second domain group adjacent to the first domain group.

In an example embodiment, a short side of the m-th slit electrode may face a short side of the (m+1)-th interval portion in a boundary between the m-th domain and the (m+1)-th domain.

In an example embodiment, a short side of the m-th slit electrode may face a short side of the (m+1)-th slit electrode in a boundary between the m-th domain and the (m+1)-th domain.

In an example embodiment, a range of inner angle forming by the m-th slit electrode and the (m+1)-th slit electrode may be about 60 degrees to about 120 degrees in a boundary between the m-th domain and the (m+1) domain.

In an example embodiment, each of the m-th and (m+1)-th slit electrodes may include the first long side, the second long side, a first short side connecting to the first and second long sides to have a narrow width and a second short side opposite to the first short side to have a wider width than the first short side. For one example, the first short side of the m-th slit electrode may be opposite to the second short side of the (m+1)-th slit electrode at a boundary between the m-th domain and the (m+1)-th domain. For another example, the second short side of the m-th slit electrode may be opposite to the first short side of the (m+1)-th slit electrode at a boundary between the m-th domain and the (m+1)-th domain.

In an example embodiment, each of the m-th and (m+1)-th slit electrodes may include the first long side, the second long side, a first short side connecting to the first and second long sides to have a narrow width and a second short side opposite to the first short side to have a wider width than the first short side. For one example, the first short side of the m-th slit electrode may be opposite to the first short side of the (m+1)-th slit electrode at a boundary between the m-th domain and the (m+1)-th domain. For another example, the second short side of the m-th slit electrode may be opposite to the second short side of the (m+1)-th slit electrode at a boundary between the m-th domain and the (m+1)-th domain.

In an example embodiment, the pixel electrode may further include a dividing electrode extended in a second direction crossing the first direction. The dividing electrode may divide the pixel electrode into an upper domain and a lower domain.

A plurality of slit electrodes disposed on the upper domain may be symmetric to a plurality of slit electrodes disposed on the lower domain.

In an example embodiment, the pixel electrode may be divided into an upper domain and a lower domain by an imaginary line extended in a second direction crossing the first direction. A plurality of slit electrodes disposed on the upper domain may be symmetric to a plurality of slit electrodes disposed on the lower domain.

According to another aspect, a display device includes a display substrate, an opposite substrate and a liquid crystal layer. The display substrate includes a switching element and a pixel electrode. The switching element is formed on a base substrate. The pixel electrode is electrically connected to the switching element. The pixel electrode includes a plurality of slit electrodes respectively disposed on a plurality of domains in parallel defined in a first direction. The slit electrodes are extended in a direction different from the first direction. A slope of a first long side of the slit electrodes is different from that of a second long side opposite to the first end side of the slit electrode. The opposite substrate is opposite to the display substrate to comprise a common electrode. The liquid crystal layer is interposed between the display substrate and the opposite substrate.

In an example embodiment, the pixel electrode may further include a connection electrode disposed in correspondence with a boundary of the domains to be connected to the slit electrode.

In an example embodiment, the pixel electrode may be defined as a plurality of domain groups. An m-th domain and an (m+1)-th domain ('m' is an odd number) may be included in each of the domain groups. An m-th slit electrode and an m-th interval portion defined by the m-th slit electrode may be formed on the m-th domain. An (m+1)-th slit electrode extended in a direction different from a direction of the m-th slit electrode and an (m+1)-th interval portion defined by an (m+1)-th slit electrode may be formed on the (m+1)-th domain.

In an example embodiment, the slit electrodes disposed on a first domain group of the domain groups may be symmetric to the slit electrodes disposed on a second domain group adjacent to the first domain group.

In an example embodiment, a short side of the m-th slit electrode may face a short side of the (m+1)-th interval portion in a boundary between the m-th domain and the (m+1)-th domain.

In an example embodiment, a short side of the m-th slit electrode may face a short side of the (m+1)-th slit electrode in a boundary between the m-th domain and the (m+1)-th domain.

In an example embodiment, each of the m-th and (m+1)-th slit electrodes may include the first long side, the second long side, a first short side connecting to the first and second long sides to have a narrow width and a second short side opposite to the first short side to have a wider width than the first short side. For one example, the first short side of the m-th slit electrode may be opposite to the second short side of the (m+1)-th slit electrode at a boundary between the m-th domain and the (m+1)-th domain. For another example, the second short side of the m-th slit electrode may be opposite to the first short side of the (m+1)-th slit electrode at a boundary between the m-th domain and the (m+1)-th domain.

In an example embodiment, each of the m-th and (m+1)-th slit electrodes may include the first long side, the second long side, a first short side connecting to the first and second long sides to have a narrow width and a second short side opposite to the first short side to have a wider width than the first short side. For example, the first short side of the m-th slit electrode may be opposite to the first short side of the (m+1)-th slit electrode at a boundary between the m-th domain and the (m+1)-th domain. For another example, the second short side of the m-th slit electrode may be opposite to the second short side of the (m+1)-th slit electrode at a boundary between the m-th domain and the (m+1)-th domain.

According to a display substrate and a display device having the display substrate, a plurality of domains is formed in one line, so that a visibility distortion between adjacent domains may be compensated to increase compensation efficiency.

Moreover, a plurality of domains is formed on one line, so that a direction of liquid crystal molecules is controlled so that a generation of texture may be decreased at a boundary between domains.

Additionally, in the slit electrode, short sides opposite to each other have the different widths from each other, and one short side is formed to have a predetermined angle with respect to another short side. Thus, directions of electric field applied to liquid crystal molecules may be different from each other by domains, so that director of liquid crystal molecules may be varied.

Moreover, an inner angle between the slit electrodes are formed along a center portion of boundary between domains is varied, so that a direction of liquid crystal molecules disposed at the boundary between domains is controlled so that a compensation efficiency of visibility distortion may be increased.

Moreover, the protrusion electrode is formed between the connection electrode and the slit electrode, so that a direction of liquid crystal molecules disposed at a boundary between domains may be controlled.

Moreover, the connection electrode is omitted, so that a direction of liquid crystal molecules is continuous so that light transmittance may be increased.

BRIEF DESCRIPTION OF THE DRAWINGS

The above and other features will become more apparent by describing in detailed example embodiments thereof with reference to the accompanying drawings, in which.

DETAILED DESCRIPTION

Figure 1:
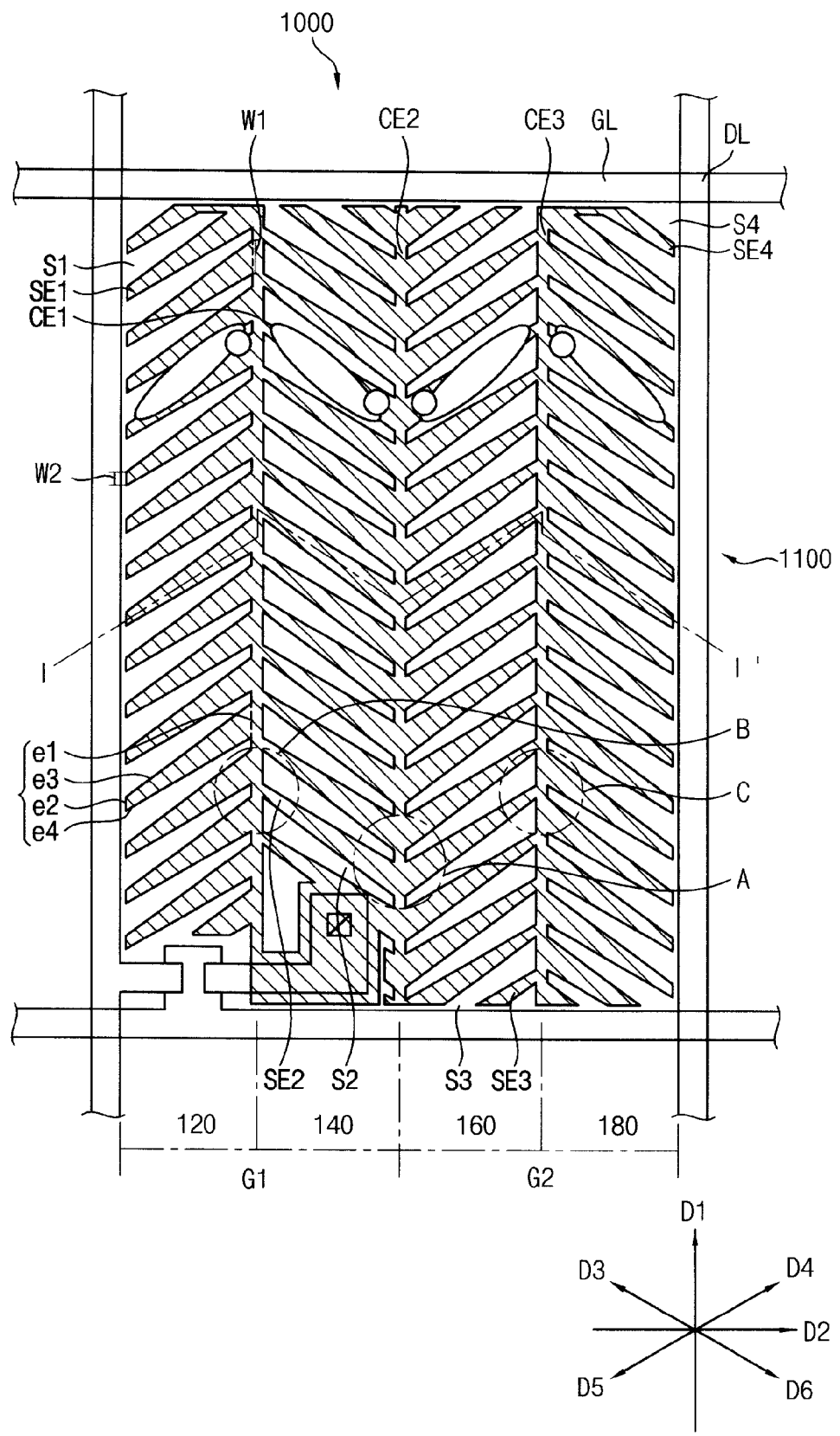
FIG. 1 is a plan view illustrating a display device according to a first embodiment.

The subject matter disclosed herein is described more fully hereinafter with reference to the accompanying drawings, in which example embodiments shown. The subject matter described herein may, however, be embodied in many different forms and should not be construed as limited to the example embodiments set forth herein. Rather, these example embodiments are provided so that this disclosure will be thorough and complete, and will fully convey the scope of the subject matter to those skilled in the art. In the drawings, the sizes and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the subject matter described herein.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the subject matter will be explained in detail with reference to the accompanying drawings.

Example Embodiment 1

Figure 2:
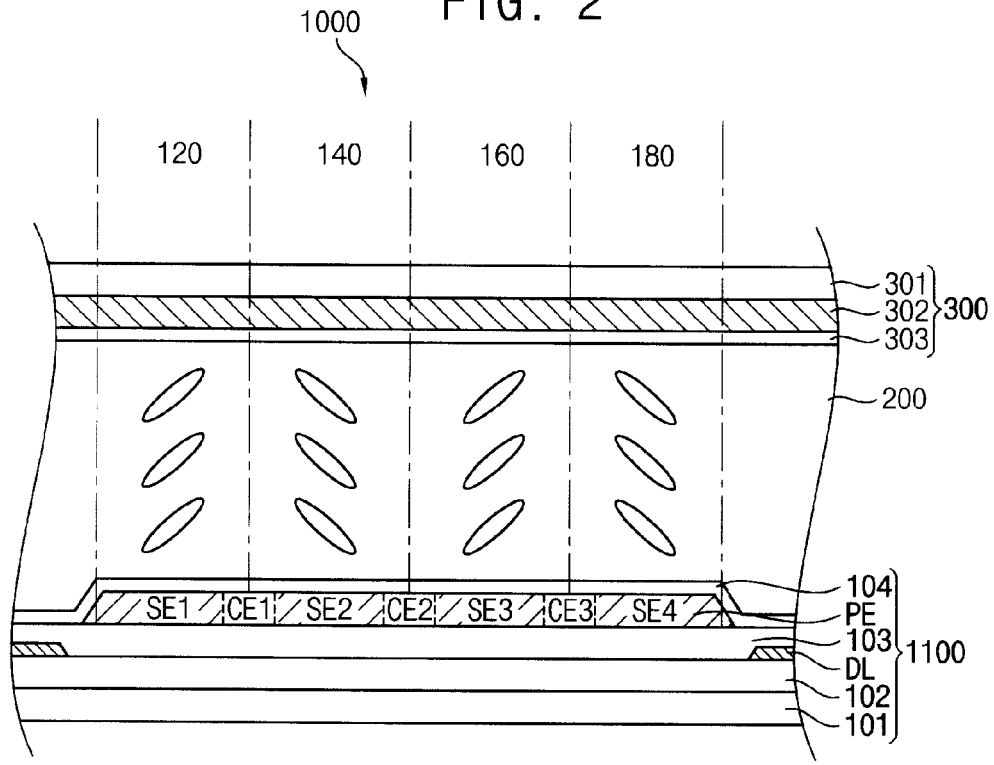
FIG. 2 is a cross-sectional view taken along a line I-I' of FIG. 1.

FIG. 1 is a plan view illustrating a display device 1000 according to a first embodiment. FIG. 2 is a cross-sectional view taken along a line I-I' of FIG. 1.

Referring to FIGS. 1 and 2, the display device 1000 according to the first embodiment includes a display substrate 1100, a liquid crystal layer 200, and an opposite substrate 300.

The opposite substrate 300 is disposed facing the display substrate 1100. The opposite substrate 300 may include a base substrate 301, a common electrode 302, and an upper alignment layer 303.

Here, the common electrode 302 may be a planar plate electrode of patternless.

The liquid crystal layer 200 may be interposed between the opposite substrate 300 and the display substrate 1100. For example, in a supper vertical alignment (SVA) mode, the liquid crystal layer 200 may include a curing layer formed between the display substrate 1100 and the opposite substrate 300. A monomer injected in the liquid crystal layer 200 is cured by irradiating ultraviolet light after a gradation voltage is applied thereto, so that the curing layer may be formed. Thus, liquid crystal molecules may have a pretilt angle due to the curing layer.

The display substrate 1100 may include a base substrate 101, a switching element 400, a gate line GL, a data line DL, a gate insulation layer 102, a protection layer 103, a pixel electrode PE1 and a lower alignment layer 104.

The pixel electrode PE1 may be formed on a pixel area. For one example, the pixel electrode PE1 may be formed within the pixel area defined by the gate line GL and the data line DL. Alternatively, for one example, the pixel PE1 may be formed to overlap with the pixel area defined by the gate line GL and the data line DL. For another example, the pixel PE1 may be formed within a pixel area defined by a storage line (not shown) and the data line DL.

Hereinafter, it will be described that the pixel electrode PE1 is formed within a pixel area defined by the gate line GL and the data line DL.

The pixel electrode PE1 may include a plurality of domains.

In a display substrate of a conventional display device, a plurality of domains (i.e., four domains) is formed on four quadrants defined by an x axis and a y axis. The four quadrants may include an upper right quadrant defined by a +x axis and a +y axis, a lower right quadrant defined by a +x axis and a −y axis, a lower left quadrant defined by a −x axis and a −y axis, and an upper left quadrant defined by a −x axis and a +y axis. However, in the display substrate 1100 according to the present embodiment, a plurality of domains (i.e., 2n domains, wherein 'n' is a natural number) may be formed on one line extending in a +x axis.

When the plural domains include an m-th domain (wherein, 'm' is an odd number smaller than 2n) and an (m+1)-th domain, the m-th domain includes an m-th slit electrode and an m-th interval portion defined by the m-th slit electrode. Moreover, the (m+1)-th domain includes an (m+1)-th slit electrode extending in different direction from that of the m-th slit electrode and an (m+1)-th interval portion defined by the (m+1)-th slit electrode.

Hereinafter, it will be described when 'm' is 4, that is, the pixel electrode PE1 has four domains.

The four domains may be a first domain 120, a second domain 140, a third domain 160, and a fourth domain 180. Here, the first domain 120 and the second domain 140 may define a first domain group G1, and the third domain 160 and the fourth domain 180 may define a second domain group G2.

In one example, the domains of the first domain group G1 may be symmetric with respect to the domains of the second domain group G2. For another example, the domains of the first domain group G1 may be asymmetric to each other and be continuously formed. According to one embodiment, the domain groups G1 and G2 are formed in a symmetric shape as shown in FIGS. 1 and 2.

The pixel electrode PE1 according to one embodiment may include a plurality of slit electrodes SE1 to SE4 and a plurality of interval portions S1 to S4 corresponding to each of the domains and a plurality of connection electrodes CE1 to CE3 corresponding to boundaries between the domains.

That is, the first domain 120 may include a plurality of first slit electrodes SE1 and a plurality of first interval portions S1, and the second domain 140 may include a plurality of second slit electrodes SE2 and a plurality of second interval portions S2. Moreover, the third domain 160 may include a plurality of third slit electrodes SE3 and a plurality of third interval portions S3, and the fourth domain 180 may include a plurality of fourth slit electrodes SE4 and a plurality of fourth interval portions S4.

The first to fourth slit electrodes SE1, SE2, SE3 and SE4 may include a first short side e1, a second short side e2, a first long side e3 and a second long side e4. The second short side e2 is opposite to the first short side e1. A width w1 of the first short side e1 is different from a width w2 of the second short side e2. In this case, the width w1 of the first short side e1 may be greater than the width w2 of the second short side e2. For example, a range of the width w1 of the first short side e1 may be about 0 μm to about 15 p.m. For one example, the first short side e1 is in parallel with the second short side e2. For another example, the first short side e1 is not in parallel with the second short side e2.

Moreover, the first long side e3 and the second long side e4 connect the first short side e1 and the second short side e2. The first long side e3 is opposite to the second long side e4. The first long side e3 may be inclined to have a predetermined angle with respect to the second long side e4. That is, the first long side e3 may cross with the second long side e4.

Thus, the slit electrodes SE1 to SE4 may be defined as a quadrangle shape having the first short side e1, the second short side e2, the first long side e3, and the second long side e4. Alternatively, the slit electrodes SE1 to SE4 may be defined as a triangle shape having the first short side e1, the first long side e3 and the second long side e4. That is, when the second short side e2 is zero, the slit electrodes SE1 to SE4 may have only three sides. When the second short side e2 is zero, a turning force of liquid crystal molecules from the second short side e2 toward the first short side e1 may be maximum due to an electric field formed in liquid crystal molecules.

Moreover, the interval portions S1 to S4 according to the present embodiment may be formed as a shape identical to the slit electrodes SE1 to SE4.

The connection electrodes CE1 to CE3 may have a stripe shape. The connection electrodes CE1 to CE3 may be formed in parallel with boundaries B1 to B3 between the domains as shown in FIGS. 1 and 2. That is, the pixel electrode PE1 including four domains may have three boundaries B1 to B3. The connection electrodes CE1 to CE3 may be formed in the boundaries B1 to B3.

Moreover, although not shown in FIGS. 1 and 2, the connection electrode may be formed at an edge of the pixel electrode PE1.

Moreover, although not shown in FIGS. 1 and 2, the connection electrodes CE1 to CE3 may be omitted. When the connection electrodes CE1 to CE3 are omitted, the slit electrodes SE1 to SE4 which are included in each domain may be directly connected to each other. Thus, liquid crystal molecules, which are arranged on a boundary B1 between the first slit electrode SE1 of first domain 120 and the second slit electrode SE2 of the second domain 140, may be continuously rotated like a domino. Therefore, a visibility distortion may be compensated, which is generated by liquid crystal molecules adjacent to liquid crystal molecules arranged on the first slit electrode SE1 and liquid crystal molecules adjacent to liquid crystal molecules arranged on the second slit electrode SE2.

Figure 3A:
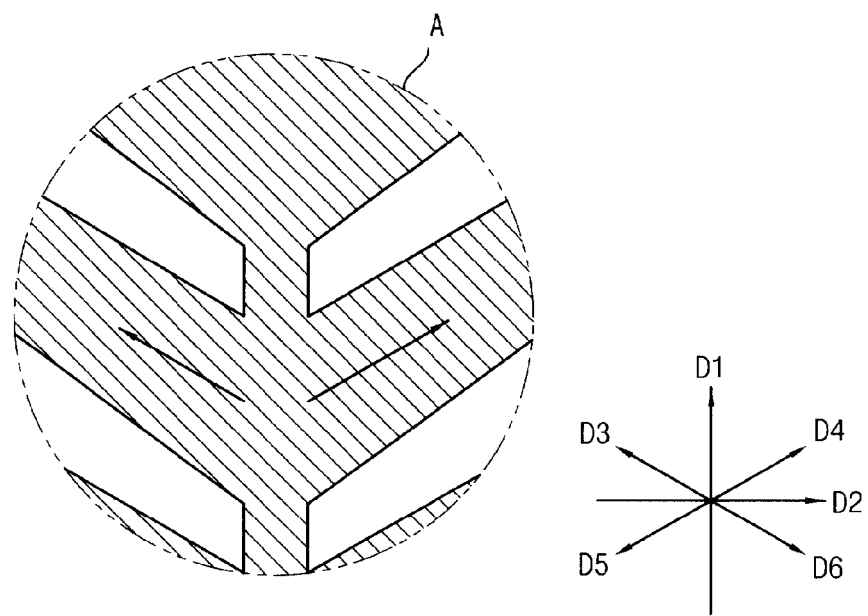
FIG. 3A is an enlarged view of a portion 'A' of FIG. 1.
Figure 3B:
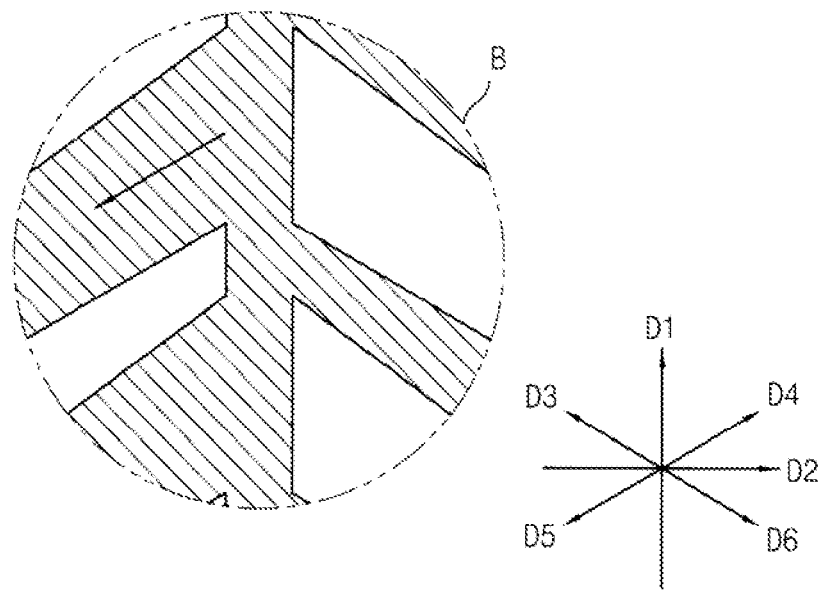
FIG. 3B is an enlarged view of a portion 'B' of FIG. 1.
Figure 3C:
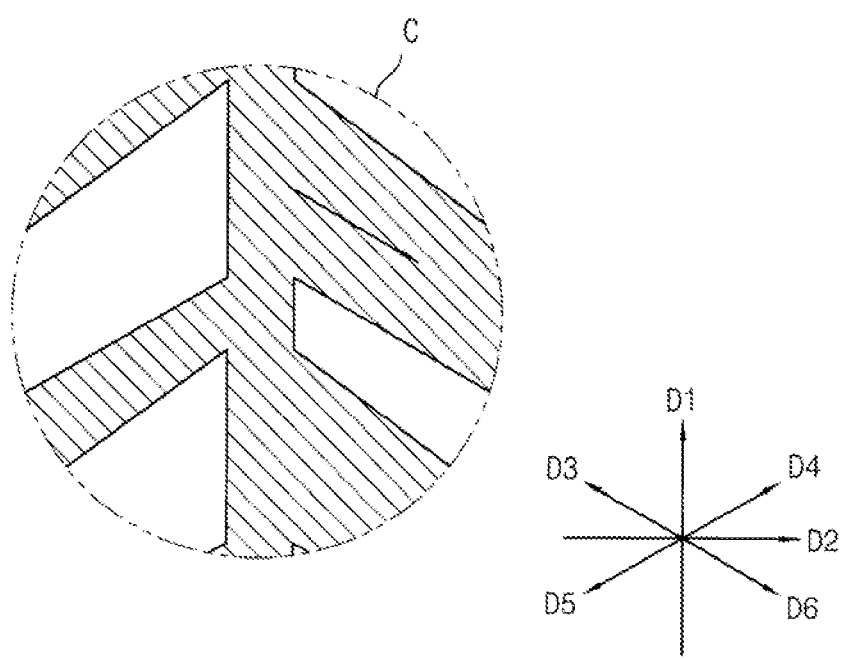
FIG. 3C is an enlarged view of a portion 'C' of FIG. 1.

FIG. 3A is an enlarged view of a portion 'A' of FIG. 1. FIG. 3B is an enlarged view of a portion 'B' of FIG. 1. FIG. 3C is an enlarged view of a portion 'C' of FIG. 1.

Referring to FIGS. 1 to 3C, it will be described that a connection relationship between the slit electrodes SE1 to SE4 and the connection electrodes CE1 to CE3 in accordance with one embodiment.

FIG. 3A shows a connection relationship of the slit electrodes SE1 to SE4 and the connection electrodes CE1 to CE3 that are formed between the first domain G1 and the second domain G2.

A second connection electrode CE2 may be formed in accordance with a boundary B2 between the first domain group G1 and the second domain group G2. A second slit electrode SE2 of the second domain 140 of the first domain group G1 may be extended from the second connection electrode CE2 along a third direction D3 that is an inclined direction. Moreover, a third slit electrode SE3 of a third domain 160 of the second domain group G2 may be extended from the second connection electrode CE2 along a fourth direction D4. The fourth direction D4 is symmetric to the third direction D3 in a left and right direction when viewed in FIG. 3A.

A first short side e1 of the second slit electrode SE2 is connected to the second connection electrode CE2, and a first short side e1 of the third slit electrode SE3 is connected to the second connection electrode CE2. Thus, the second slit electrode SE2 may symmetric to the third slit electrode SE3. In this case, an inner angle between the second slit electrode SE2 and the third slit electrode SE3 may be about 60 degrees to about 120 degrees. For example, the inner angle between the second slit electrode SE2 and the third electrode SE3 may be about 90 degrees.

Moreover, a second interval portion S2 may be formed between the second slit electrodes SE2, and a third interval portion S3 may be formed between the third slit electrodes SE3. The second and third interval portions S2 and S3 may be respectively defined as the third direction D3 and the fourth direction D4 by the slit electrodes SE1 to SE4, so that the second and third interval portions S2 and S3 are symmetric to each other, which are identical to the slit electrodes SE1 to SE4.

FIG. 3B shows a connection relationship of the slit electrodes SE1 to SE4 and the connection electrodes CE1 to CE3 that are formed between the first domain 120 and the second domain 140.

A first connection electrode CE1 may be formed in the first direction in correspondence with a boundary B1 between the first domain 120 and the second domain 140. A first slit electrode SE1 of the first domain 120 may be extended from the first connection electrode CE1 along a fifth direction D5. The fifth direction D5 is symmetric to the third direction D3 in an upper and lower direction when viewed in FIG. 3B. Moreover, a second slit electrode SE2 of the second domain 140 may be extended from the first connection electrode CE1 along a sixth direction D6. The sixth direction is symmetric to the fourth direction D4 in an upper and lower direction when viewed in FIG. 3B.

A first short side e1 of the first slit electrode SE1 may be connected to the first connection electrode CE1, and a second short side e2 of the second slit electrode SE2 may be connected to the first connection electrode CE1. The first short side e1 and the second short side e2 in which widths thereof are different from each other are extended from the first connection CE1, so that the first slit electrode SE1 and the second slit electrode SE2 may be asymmetric with each other. In this case, a width of the first short side e1 may be greater than that of the second short side e2.

Moreover, a plurality of first interval portions S1 may be formed between the first slit electrodes SE1, and a plurality of second interval portions S2 may be formed between the second slit electrodes SE2. The first interval portions S1 and the second interval portions S2 may be respectively defined as the fifth direction D5 and the sixth direction D6 by the slit electrodes SE1 to SE4, so that the first and second interval portions S1 and S2 are symmetric to each other, which are identical to the slit electrodes SE1 to SE4.

That is, the first slit electrodes SE1 may be not formed on an identical line to the second slit electrodes SE2, and the first slit electrodes SE1 may be alternately formed on an another line. Moreover, the first slit electrodes SE1 extended from the first connection electrode CE1 may be formed symmetric to the second interval portions S2 defined between the second slit electrodes SE2 extended from the first connection electrode CE1. In this case, an inner angle between the first slit electrode SE1 and the second interval portion S2 may be about 60 degrees to about 120 degrees. For example, the inner angle between the first slit electrode SE1 and the second interval portion S2 may be about 90 degrees.

FIG. 3C shows a connection relationship of the slit electrodes SE1 to SE4 and the connection electrodes CE1 to CE3 that are formed between the third domain 160 and the fourth domain 180.

A third connection electrode CE3 may be formed in the first direction in correspondence with a boundary B3 between the third domain 160 and the fourth domain 180. A third slit electrode SE3 of the third domain 160 may be extended from the third connection electrode CE3 along a fifth direction D5. The fifth direction D5 is symmetric to the third direction D3 in an upper and lower direction when viewed in FIG. 3C. Moreover, a fourth slit electrode SE4 of the fourth domain 180 may be extended from the third connection electrode CE3 along the sixth direction D6. The sixth direction is symmetric to the fourth direction D4 in an upper and lower direction when viewed in FIG. 3C.

A second short side e2 of the third slit electrode SE3 may be connected to the third connection electrode CE3, and a first short side e1 of the fourth slit electrode SE4 may be connected to the third connection electrode CE3. Since the first short side e1 and the second short side e2 having widths different from each other are extended from the third connection electrode CE3, the third slit electrode SE3 may be asymmetric to the fourth slit electrode SE4. In this case, a width of the first short side e1 may be greater than that of the second short side e2.

Moreover, a third interval portions S3 may be formed between the third slit electrodes SE3, and a fourth interval portions S4 may be formed between the fourth slit electrodes SE4. The third and fourth interval portions S3 and S4 may be respectively defined as the fifth direction D5 and the sixth direction D6 by the slit electrodes SE1 to SE4, so that the third and fourth interval portions S3 and S4 are symmetric to each other, which are identical to the slit electrodes SE1 to SE4.

That is, the third slit electrodes SE3 may be not formed on an identical line to the fourth slit electrodes SE4, and the third slit electrodes SE3 may be alternately formed on another line. Moreover, the third slit electrodes SE3 extended from the third connection electrode CE3 may be formed symmetric to the fourth interval portions S4 defined between the fourth slit electrodes SE4 extended from the third connection electrode CE3. In this case, an inner angle of the third slit electrode SE3 and the fourth slit electrode SE4 may be about 60 degrees to about 120 degrees. For example, the inner angle of the third slit electrode SE3 and the fourth slit electrode SE4 may be about 90 degrees.

In this embodiment, the first domain group G1 is symmetric to the second domain group G2, so that a portion of the pixel electrode PE1 shown in FIG. 3B is symmetric to a portion of the pixel electrode PE1 shown in FIG. 3C.

Figure 4:
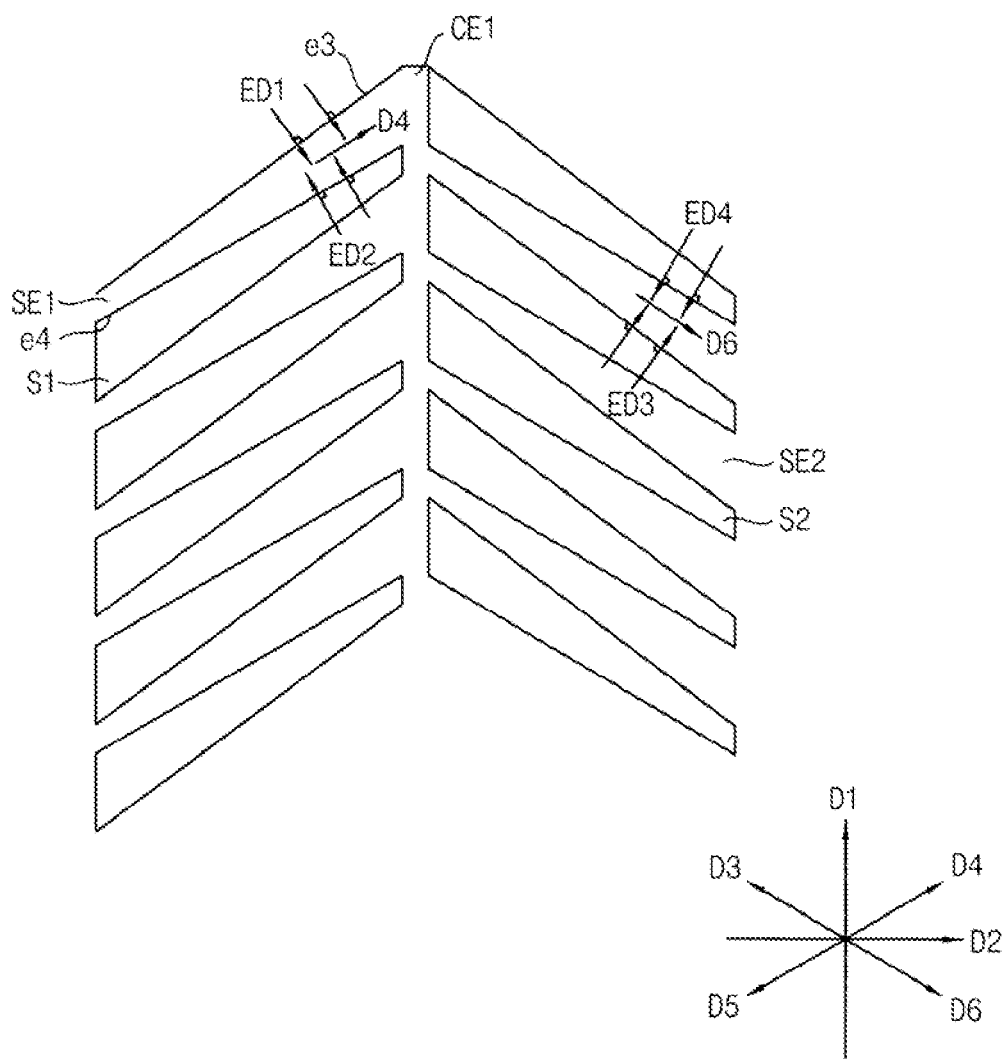
FIG. 4 is a detailed diagram illustrating a motion of liquid crystal molecules in accordance with the slit electrode of FIG. 1.

FIG. 4 is a detailed diagram illustrating a motion of liquid crystal molecules in accordance with the slit electrode of FIG. 1.

Referring to FIGS. 1 to 4, an electric field is formed between the common electrodes 302, and the first slit electrode SE1 extended from the first connection electrode CE1 formed on the first domain 120, to rotate the liquid crystal molecules arranged on the first slit electrode SE1 along the fourth direction D4.

That is, the electric field may be formed along a first electric field direction ED1 substantially perpendicular to the first long side e3 of the first slit electrode SE1 and along a second electric field direction ED2 substantially perpendicular to the second long side e4 of the first slit electrode SE1, so that electric force of the fourth direction D4 may be generated in accordance with a vector sum of the first electric direction ED1 and the second electric field direction ED2. Thus, the liquid crystal molecules may be rotated on the first slit electrode SE1 in the fourth direction D4 due to the electric force.

Moreover, the electric field is formed between the common electrodes 302, the second slit electrode SE2 extended from the first connection electrode CE1 formed on the second domain 140, to rotate the liquid crystal molecules arranged on the second slit electrode SE2 along the sixth direction D6.

That is, the electric field may be formed along a third electric field direction ED3 substantially perpendicular to the first long side e3 of the second slit electrode SE2 and along a fourth electric field direction ED4 substantially perpendicular to the second long side e4 of the second slit electrode SE2, so that electric force of the sixth direction D6 may be generated in accordance with a vector sum of the third electric direction ED3 and the fourth electric field direction ED4. Thus, the liquid crystal molecules may be rotated on the second slit electrode SE2 in the sixth direction D6 due to the electric force.

The liquid crystal molecules arranged on the first slit electrode SE1 and the liquid crystal molecules arranged on the second slit electrode SE2 form an inner angle of about 90 degrees by the slit electrodes SE1 to SE4, so that the visibility distortion generated at a side surface of the display device may be offset.

Figure 5:
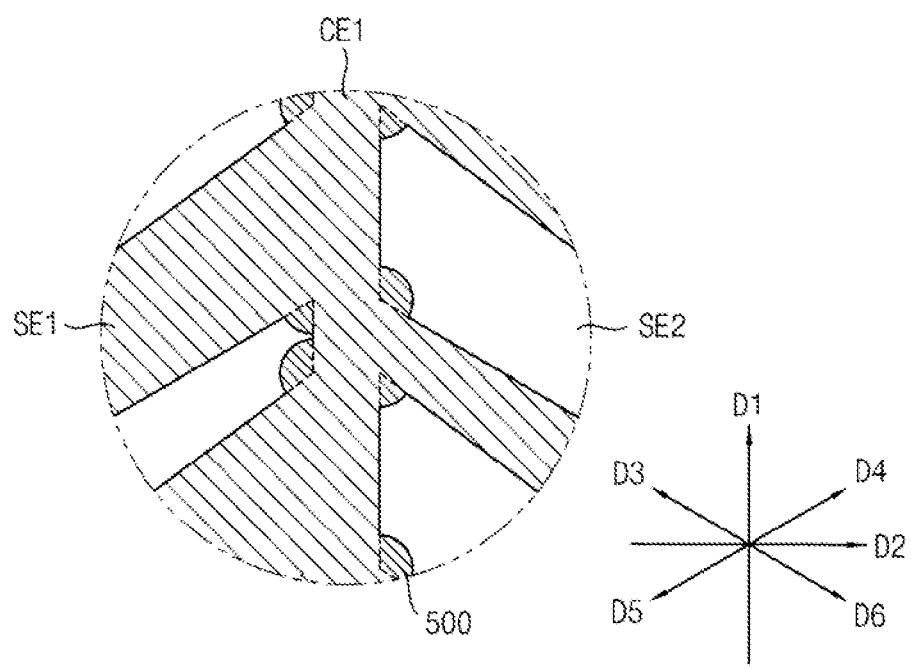
FIG. 5 is an enlarged view illustrating a connection electrode of FIG. 1.

FIG. 5 is an enlarged view illustrating a connection electrode of FIG. 1.

Referring to FIG. 5, a protrusion electrode 500 may be formed at a connection portion between the connection electrodes CE1 to CE3 and the slit electrodes SE1 to SE4. The protrusion electrode 500 may control a direction of liquid crystal molecules arranged between the connection electrodes CE1 to CE3 and the slit electrodes SE1 to SE4.

Moreover, although not shown in FIG. 5, a connection portion between the first long side e3 and the second long side e4 of the connection electrodes CE1 to CE3 and the slit electrodes SE1 to SE4 may be rounded in a recess shape or a protruded shape.

Therefore, due to the protrusion electrode and the rounding process, liquid crystal molecules of the connection portion of the connection electrode CE1 to CE3 and the slit electrodes SE1 to SE4 may be controlled.

According to the present embodiment, a plurality of domains is formed in one line, so that a visibility distortion between adjacent domains may be compensated to increase compensation efficiency.

Example Embodiment 2

Figure 6:
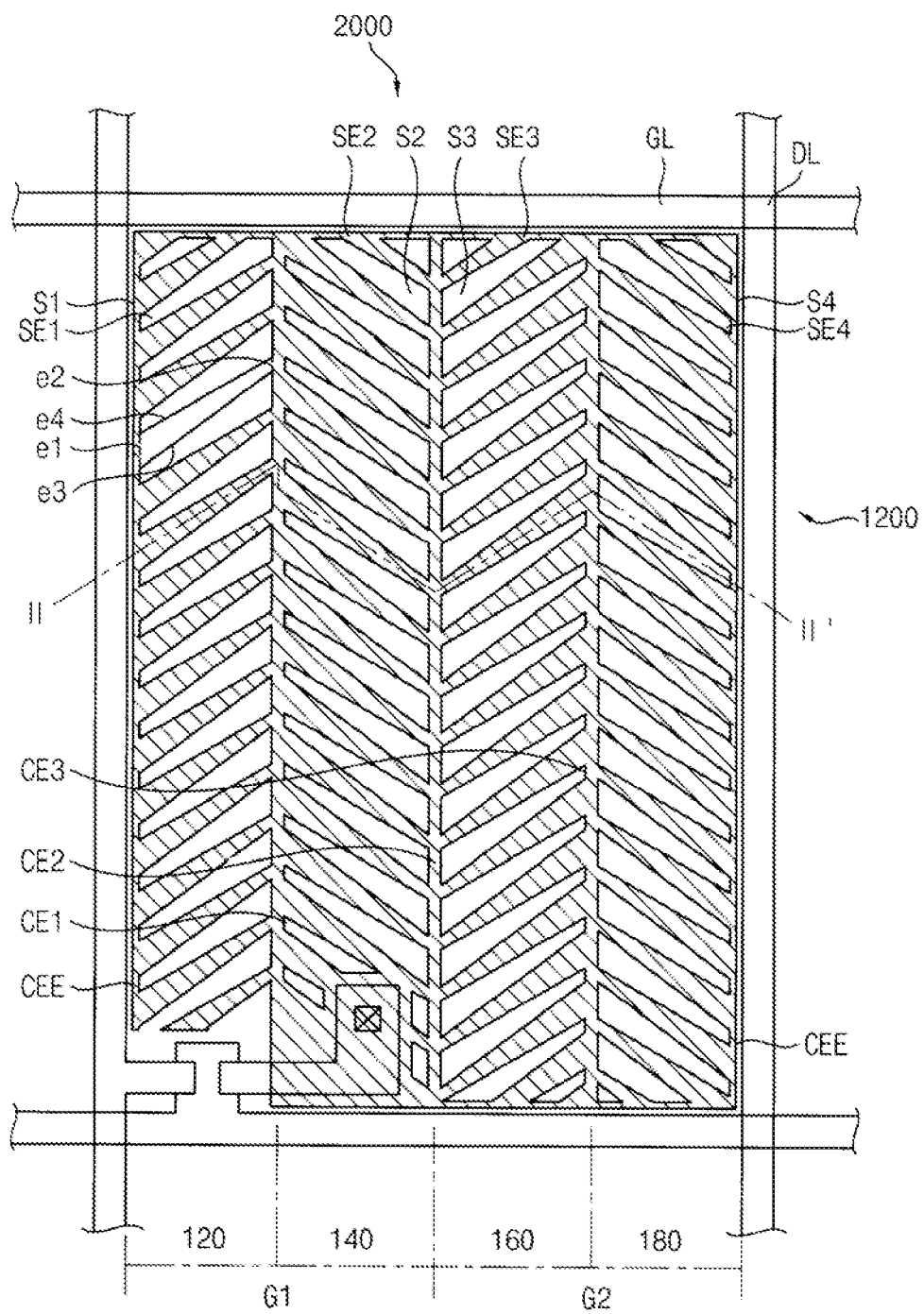
FIG. 6 is a plan view illustrating a display device according to a second embodiment
Figure 6:
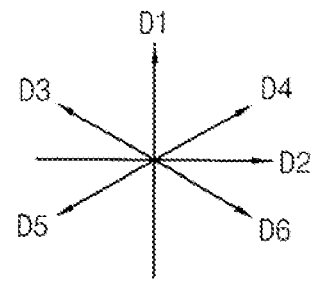
Figure 7:
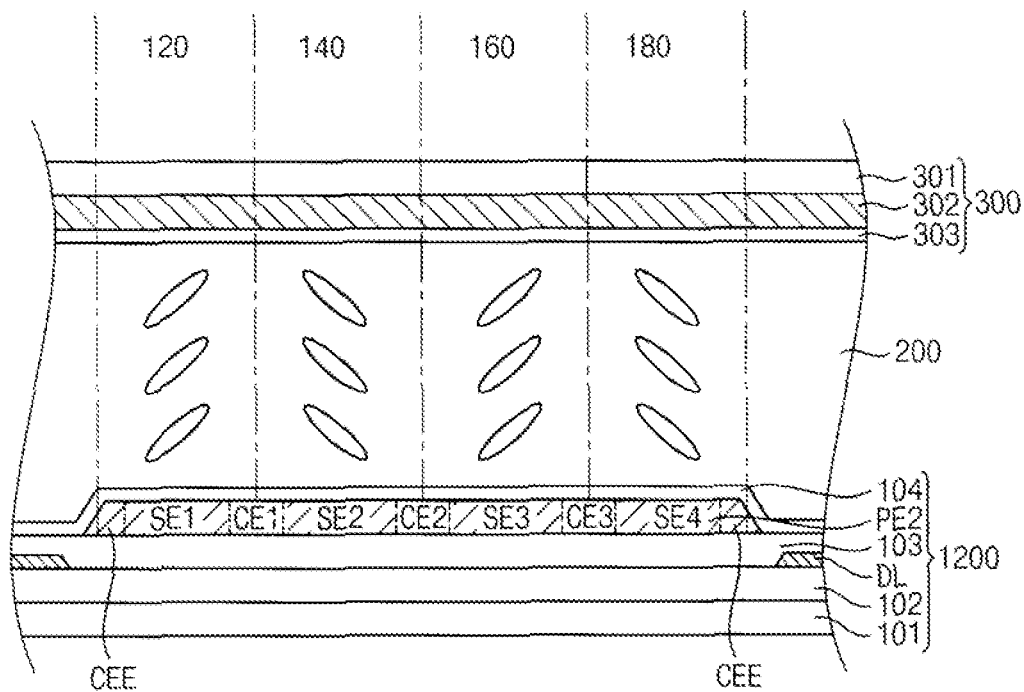
FIG. 7 is a cross-sectional view taken along a line II-IF of FIG. 6.

FIG. 6 is a plan view illustrating a display device 2000 according to second embodiment. FIG. 7 is a cross-sectional view taken along a line II-IF of FIG. 6.

The display substrate 1200 is substantially the same as the display substrate according to the first embodiment except that a connection electrode is formed at an edge portion of the pixel electrode PE2 in parallel with boundaries B1 to B3 between domains and a forming direction of slit electrodes included in each of the domains is different from a forming direction of slit electrodes according to the first embodiment. Thus, the same reference numerals will be used to refer to the same or like parts as those described in the first embodiment and any further explanation concerning the above elements will be omitted.

Referring to FIGS. 6 and 7, it will be described that a connection relationship between the slit electrodes SE1 to SE4 that are formed between the first domain group G1 and the second domain group G2 and the connection electrodes CE1 to CE3.

A second connection electrode CE2 may be formed along a first direction D1 in accordance with a boundary B2 between the first domain group G1 and the second domain group G2. A second slit electrode SE2 of the second domain 140 of the first domain group G1 may be extended from the second connection electrode CE2 along a third direction D3 that is an inclined direction. Moreover, a third slit electrode SE3 of a third domain 160 of the second domain group G2 may be extended from the second connection electrode CE2 along a fourth direction D4. The fourth direction D4 is symmetric to the third direction D3 in a left and right direction when viewed in FIG. 6.

The second short side e2 of the second slit electrode SE2 is connected to the second connection electrode CE2 and the second short side e2 of the third slit electrode SE3 is connected to the second connection electrode CE2, so that the second slit electrode SE2 and the third slit electrode SE3 may be symmetric with each other. In this case, an inner angle of the second slit electrode SE2 and the third slit electrode SE3 may be about 60 degrees to about 120 degrees. For example, the inner angle of the second slit electrode SE2 and the third slit electrode SE3 may be about 90 degrees.

Moreover, a plurality of second interval portions S2 may be formed between the second slit electrodes SE2, and a plurality of third interval portions S3 may be formed between the third slit electrodes SE3. The second interval portions S2 and the third interval portions S3 may be defined as the third direction D3 and the fourth direction D4, respectively, by the slit electrodes SE1 to SE4, so that the second and third interval portions S2 and S3 may be symmetric with each other, which are similar to the slit electrodes SE1 to SE4.

Hereinafter, a connection relationship between the slit electrodes SE1 to SE4 formed between the first domain 120 and the second domain 140 and the connection electrodes CE1 to CE3 will be described.

A first connection electrode CE1 may be formed in the first direction in correspondence with the boundary B1 between the first domain 120 and the second domain 140. A first slit electrode SE1 of the first domain 120 may extend from the first connection electrode CE1 along a fifth direction D5. The fifth direction D5 is symmetric to the third direction D3 in an upper and lower direction when viewed in FIG. 6. Moreover, a second slit electrode SE2 of the second domain 140 may extend from the first connection electrode CE1 along a sixth direction D6. The sixth direction D6 is symmetric to the fourth direction D4 in an upper and lower direction when viewed in FIG. 6.

A first short side e1 of the first slit electrode SE1 may be connected to the first connection electrode CE1, and a second short side e2 of the second slit electrode SE2 may be connected to the first connection electrode CE1. The first short side e1 and the second short side e2, in which widths thereof are different from each other, that are extended from the first connection CE1, so that the first slit electrode SE1 and the second slit electrode SE2 may be asymmetric to each other. In this case, a width of the first short side e1 may be greater than that of the second short side e2.

Moreover, a plurality of first interval portions S1 may be formed between the first slit electrodes SE1, and a plurality of second interval portions S2 may be formed between the second slit electrodes SE2. The first interval portions S1 and the second interval portions S2 may be respectively defined as the fifth direction D5 and the sixth direction D6 by the slit electrodes SE1 to SE4, so that the first and second interval portions S1 and S2 are symmetric to each other, which are identical to the slit electrodes SE1 to SE4.

That is, the first slit electrodes SE1 may be not formed on an identical line to the second slit electrodes SE2, and the first slit electrodes SE1 may be alternately formed on an another line. Moreover, the first slit electrodes SE1 extended from the first connection electrode CE1 may be formed symmetric to the second interval portions S2 defined between the second slit electrodes SE2 extended from the first connection electrode CE1.

Hereinafter, it will be described that a connection relationship between the slit electrodes SE1 to SE4 formed between the third domain 160 and the fourth domain 180 and the connection electrodes CE1 to CE3 of the second domain group G2.

A third connection electrode CE3 may be formed in the first direction in correspondence with a boundary B3 between the third domain 160 and the fourth domain 180. A third slit electrode SE3 of the third domain 160 may extend from the third connection electrode CE3 along the fifth direction D5. The fifth direction D5 is symmetric to the third direction D3 in an upper and lower direction when viewed in FIG. 6. Moreover, a fourth slit electrode SE4 of the fourth domain 180 may extend from the third connection electrode CE3 along a sixth direction D6. The sixth direction D6 is symmetric to the fourth direction D4 in an upper and lower direction when viewed in FIG. 6.

A first short side e1 of the third slit electrode SE3 may be connected to the third connection electrode CE3, and a second short side e2 of the fourth slit electrode SE4 may be connected to the third connection electrode CE3. The first short side e1 and the second short side e2 in which widths thereof are different from each other are extended from the first connection CE1, so that the third slit electrode SE3 and the fourth slit electrode SE4 may be asymmetric to each other. In this case, a width of the first short side e1 may be greater than that of the second short side e2.

Moreover, a plurality of third interval portions S3 may be formed between the third slit electrodes SE3, and a plurality of fourth interval portions S4 may be formed between the fourth slit electrodes SE4. The third interval portions S3 and the fourth interval portions S4 may be respectively defined as the fifth direction D5 and the sixth direction D6 by the slit electrodes SE1 to SE4, so that the third and fourth interval portions S3 and S4 are symmetric to each other, which are identical to the slit electrodes SE1 to SE4.

That is, the third slit electrodes SE3 may be not formed an identical line to the fourth slit electrodes SE4, and the third slit electrodes SE3 may be alternately formed on an another line. Moreover, the third slit electrodes SE3 extended from the third connection electrode CE3 may be formed symmetric to the fourth interval portions S4 defined between the fourth slit electrodes SE4 extended from the third connection electrode CE3.

Moreover, the pixel electrode PE2 may further include boundary connection electrodes CEE formed at an edge of the pixel electrode PE2.

In similar to first embodiment, the liquid crystal molecules, which are arranged on the slit electrodes SE1 to SE4, may be rotated from the second short side e2 of the slit electrodes SE1 to SE4 to the first short side e1 due to an electric field formed by the slit electrodes SE1 to SE4 and the common electrode.

According to the second embodiment, a connection electrode is further formed at an edge portion of the pixel electrode, so that the liquid crystal molecules may be controlled, which are arranged on the edge portion of the pixel electrode.

Example Embodiment 3

Figure 8:
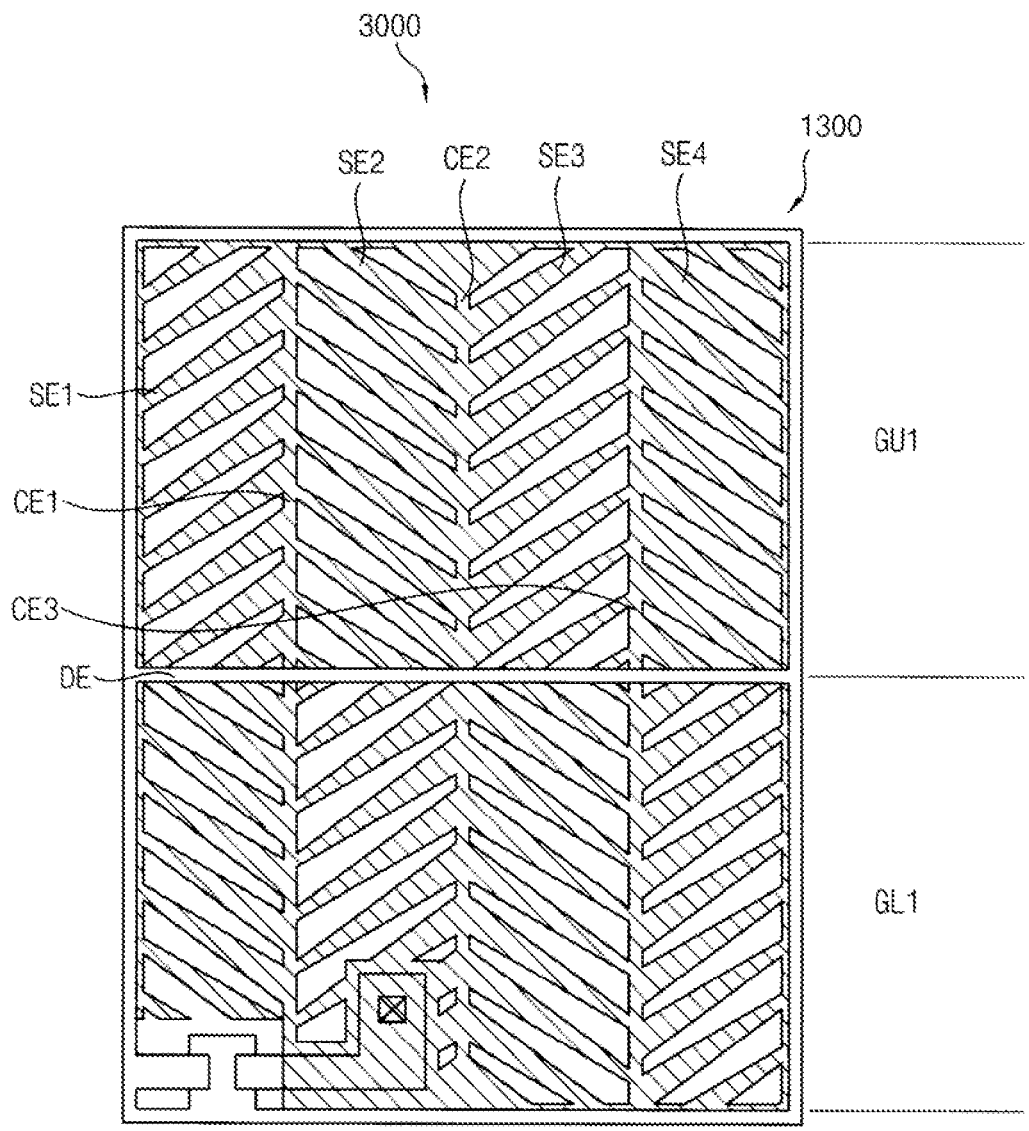
FIG. 8 is a plan view illustrating a display device according to a third embodiment

FIG. 8 is a plan view illustrating a display device 3000 according to a third embodiment.

The display substrate 1300 is substantially the same as the display substrate according to the first embodiment except that the display substrate 1300 further includes a dividing electrode DE crossing the connection electrodes and the dividing electrode DE further divides the pixel electrode PE3 into an upper domain group and a lower domain group. Thus, the same reference numerals will be used to refer to the same or like parts as those described in the first embodiment and any further explanation concerning the above elements will be omitted.

Referring to FIG. 8, the dividing electrode DE is formed in a second direction D2 crossing the first direction D1.

The slit electrodes SE1 to SE4 of the upper domain group GU1 are formed in an identical configuration as the first embodiment, and the slit electrodes SE1 to SE4 of the lower domain group GL1 are formed in a symmetric arrangement of the slit electrodes SE1 to SE4 of the upper domain group GU1 with respect to the dividing electrode DE1. Thus, the display substrate 1300 may include twice as many domains as the first embodiment.

According to the third embodiment, the dividing electrode DE is further formed along the second direction D2, so that the pixel electrode is further divided into an upper domain group and a lower domain group so that visibility distortion may be effectively enhanced. Moreover, the liquid crystal molecules arranged on the dividing electrode may be controlled.

Example Embodiment 4

Figure 9:
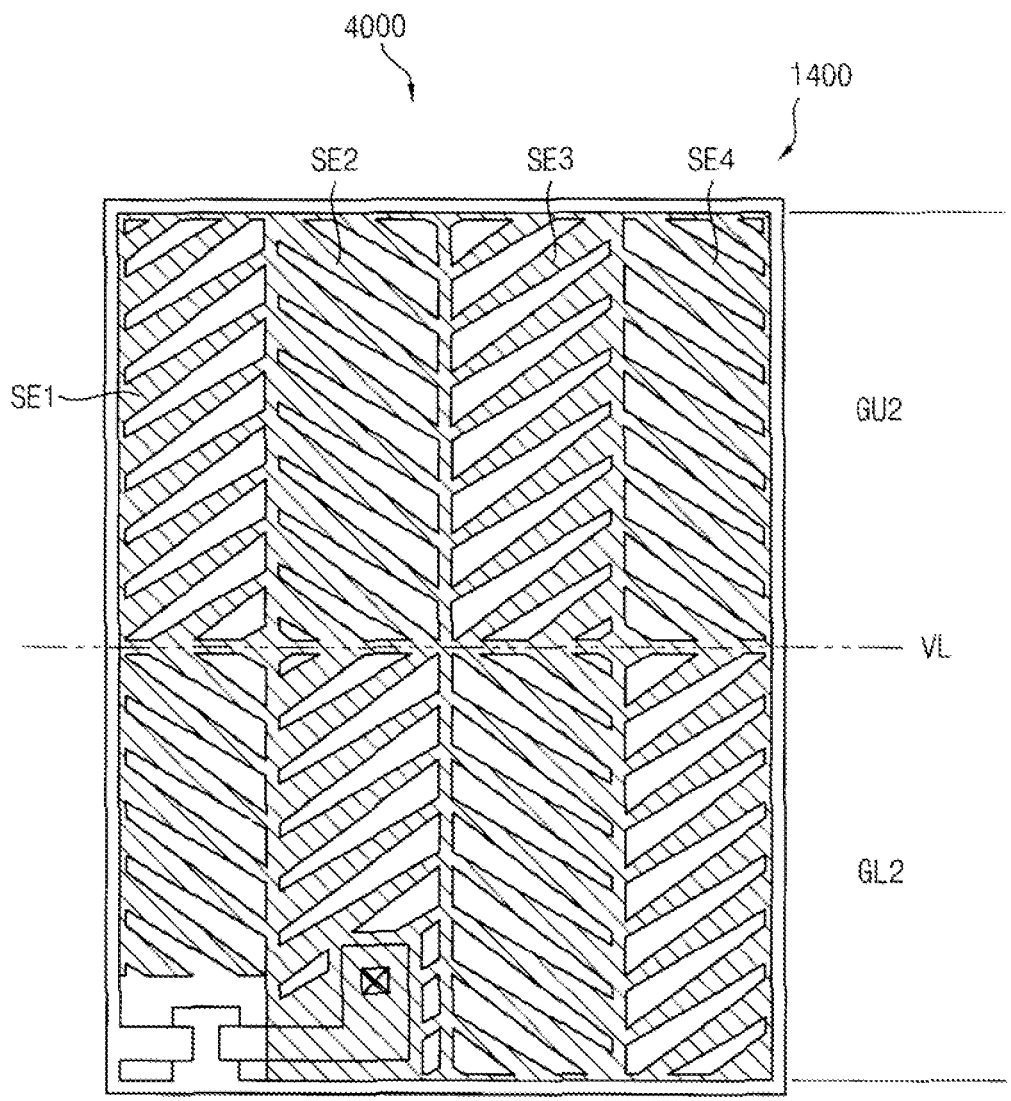
FIG. 9 is a plan view illustrating a display device according to a fourth embodiment.

FIG. 9 is a plan view illustrating a display device 4000 according to a fourth embodiment.

The display substrate 1400 according to the fourth embodiment is substantially the same as the display substrate according to second embodiment except that the pixel electrode PE4 is further divided into an upper domain group and a lower domain group even though the display substrate 1400 does not include a dividing electrode DE crossing the connection electrodes. Thus, the same reference numerals will be used to refer to the same or like parts as those described in the first embodiment and any further explanation concerning the above elements will be omitted.

Referring to FIG. 9, the pixel electrode PE4 according to the fourth embodiment may be divided into an upper domain group GU2 and a lower domain group GL2.

The slit electrodes SE1 to SE4 of the upper domain group GU2 are formed in an identical configuration as the second embodiment, and the slit electrodes SE1 to SE4 of the lower domain group GL2 are formed in symmetric arrangement of the slit electrodes SE1 to SE4 of the upper domain group GU2 with respect to a virtual line VL which connects the slit electrodes SE1 to SE4 of the lower domain group GL2 and a center portion of the connection electrodes CE1 to CE3. Thus, the display substrate 1400 according to the present embodiment may include twice as many domains as the second embodiment.

According to the fourth embodiment, the pixel electrode is further divided into an upper domain group GU2 and a lower domain group GL2 with respect to a virtual line VL formed along the second direction D2, so that visibility distortion may be effectively enhanced. Moreover, the liquid crystal molecules arranged on the virtual line VL between the upper domain group GU2 and the lower domain group GL2 may be continuously rotated in accordance with patterns of the slit electrodes SE1 to SE4.

Example Embodiment 5

Figure 10:
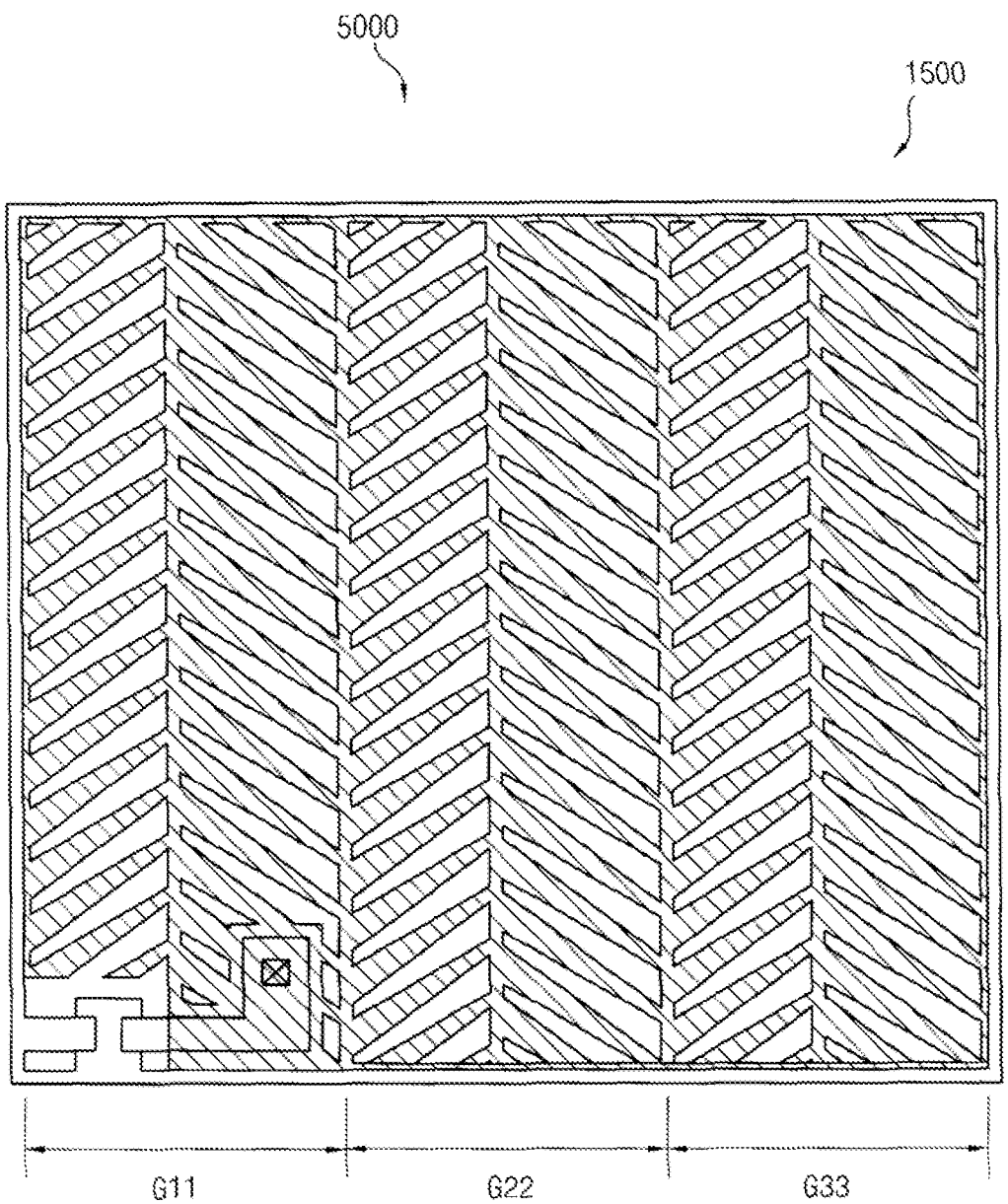
FIG. 10 is a plan view illustrating a display device according to fifth embodiment.
Figure 10:
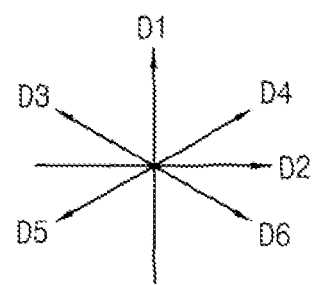

FIG. 10 is a plan view illustrating a display device 5000 according to a fifth embodiment.

The display substrate 1500 according to the fifth embodiment is substantially the same as the display substrate according to the first embodiment except that the display substrate 1500 includes six domains on one line formed in a second direction, and a first domain group G11, a second domain group G22 adjacent to the first domain group G11 and a third domain group G33 adjacent to the second domain group G22 have a same pattern as the slit electrodes SE1 to SE4. Thus, the same reference numerals will be used to refer to the same or like parts as those described in first embodiment and any further explanation concerning the above elements will be omitted.

Referring to FIG. 10, patterns of the slit electrodes SE1 to SE4 formed on the first domain group G11 of a pixel electrode PE5 according to the fifth embodiment is substantially the same as patterns of the slit electrodes SE1 to SE4 formed on the first domain group G1 of the pixel electrode PE1 according to first embodiment.

In the pixel electrode PE1 according to the first embodiment, the first domain group G1 and the second domain group G2 are symmetric to each other. However, in the pixel electrode PE5 according to the fifth embodiment, the first domain group G11 and the second domain group G22 are asymmetric to each other, the second domain group G22 and the third domain group G33 are asymmetric to each other, and the first domain groups G11 are continuously repeated. That is, the first domain groups G11 have identical slit electrodes SE1 to SE4 to the pattern of the second and third domain groups G22 and G33.

When the size of the pixel electrode PE5 according to the fifth embodiment is substantially equal to that of the pixel electrode PE1 according to the first embodiment, an interval between the first domain groups G11 according to the fifth embodiment is substantially narrower than an interval between the first domain groups G1 according to first embodiment. Thus, the display device employing the display substrate 1500 according to the fifth embodiment may further reduce a generation of texture at boundaries B1 to B3 between the domains, so that the display device in accordance with the fifth embodiment may have a superior visibility than the display device in accordance with the first embodiment 1.

Example Embodiment 6

Figure 11:
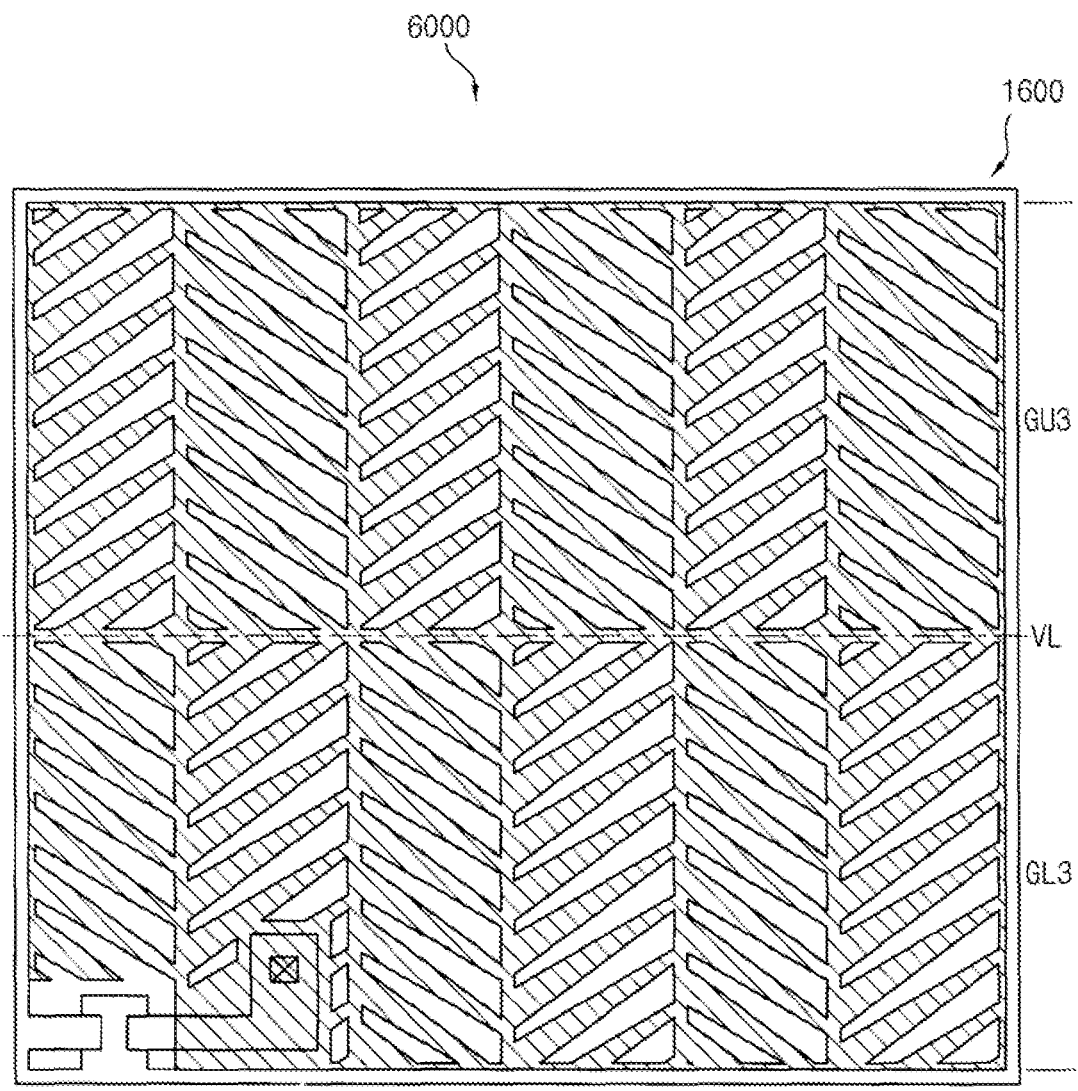
FIG. 11 is a plan view illustrating a display device according to a sixth embodiment.
Figure 11:
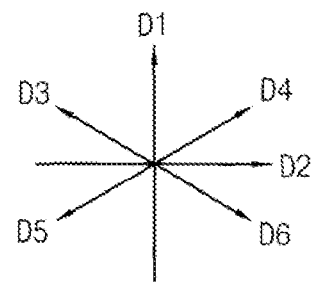

FIG. 11 is a plan view illustrating a display device 6000 according to a sixth embodiment.

The display substrate 1600 according to the sixth embodiment is substantially the same as the display substrate according to fifth embodiment except that the pixel electrode PE6 is further divided into an upper domain group GU3 and a lower domain group GL3. Thus, the same reference numerals will be used to refer to the same or like parts as those described in fifth embodiment and any further explanation concerning the above elements will be omitted.

Referring to FIG. 11, the pixel electrode PE6 according to the sixth embodiment may be further divided into an upper domain group GU3 and a lower domain group GL3.

The slit electrodes SE1 to SE4 of the upper domain group GU3 are formed in an identical configuration as the fifth embodiment, and the slit electrodes SE1 to SE4 of the lower domain group GL3 are formed in a symmetric arrangement of the slit electrodes SE1 to SE4 of the upper domain group GU3 with respect to a virtual line VL which connects the slit electrodes SE1 to SE4 of the lower domain group GL3 and a center portion of the connection electrodes CE1 to CE3. Thus, the display substrate 1600 according to the sixth embodiment may include twice as many domains as the fifth embodiment.

According to the sixth embodiment, domains are formed to have a narrow interval, and the numbers of domains included in the pixel electrode are increased, so that left visibility and right visibility of the display device may be enhanced.

As described above, according to the various embodiments, a plurality of domains are formed in one line, so that a visibility distortion between adjacent domains may be compensated to increase compensation efficiency.

Moreover, a plurality of domains is formed on one line, so that a direction of liquid crystal molecules is controlled so that a generation of texture may be decreased at a boundary between domains.

Moreover, in the slit electrode, short sides opposite to each other have the different widths from each other, and one short side is formed to have a predetermined angle with respect to another short side. Thus, directions of electric field applied to liquid crystal molecules may be different in each of the domains, so that director of liquid crystal molecules may be varied.

Moreover, an inner angle between the slit electrodes formed along a center portion of boundary between domains is varied, so that a direction of liquid crystal molecules disposed at the boundary between domains is controlled so that a compensation efficiency of visibility distortion may be increased.

Moreover, the protrusion electrode is formed between the connection electrode and the slit electrode, so that a direction of liquid crystal molecules disposed at a boundary between domains may be controlled.

Moreover, the connection electrode is omitted, so that a direction of liquid crystal molecules is continuous so that light transmittance may be increased.

The foregoing is illustrative and is not to be construed as limiting thereof. Although a few example embodiments have been described, those skilled in the art will readily appreciate that many modifications are possible in the example embodiments without materially departing from the novel teachings and advantages of the subject matter described herein. Accordingly, all such modifications are intended to be included within the scope of the subject matter as defined in the claims. In the claims, means-plus-function clauses are intended to cover the structures described herein as performing the recited function and not only structural equivalents but also equivalent structures. Therefore, it is to be understood that the foregoing is illustrative and is not to be construed as limited to the specific example embodiments disclosed, and that modifications to the disclosed example embodiments, as well as other example embodiments, are intended to be included within the scope of the appended claims. The subject matter as described herein is defined by the following claims, with equivalents of the claims to be included therein.

What is claimed is:

1. A display substrate comprising:
a base substrate;
a switching element formed on the base substrate; and
a pixel electrode electrically connected to the switching element, the pixel electrode comprising a plurality of slit electrodes that are conductive elements respectively disposed in a plurality of domains oriented substantially parallel to each other and extending substantially in a first direction, the slit electrodes each extending in a direction different from the first direction, wherein each slit electrode is an elongated structure having first and second long sides, and first and second short sides positioned opposite to each other and each extending between the first and second long sides, the first long side oriented at a first angle with respect to the first direction, the second long side oriented at a second angle with respect to the first direction, and the first angle being different from the second angle.

2. The display substrate of claim 1, wherein the pixel electrode further comprises a connection electrode disposed in correspondence with a boundary of one of the domains, and connected to one or more of the slit electrodes.

3. The display substrate of claim 2, wherein the connection electrode comprises a protrusion electrode extending into an area between the slit electrodes to control a direction of liquid crystal molecules.

4. The display substrate of claim 1, wherein the pixel electrode is defined as a plurality of domain groups, an m-th domain and an (m+1)-th domain ('m' is an odd number) are included in each of the domain groups,
- an m-th slit electrode and an m-th interval portion defined by the m-th slit electrode are formed on the m-th domain, and
- an (m+1)-th slit electrode extended in a direction different from a direction of the m-th slit electrode and an (m+1)-th interval portion defined by an (m+1)-th slit electrode are formed on the (m+1)-th domain.

5. The display substrate of claim 4, wherein the slit electrodes disposed on a first domain group of the domain groups are symmetric to the slit electrodes disposed on a second domain group adjacent to the first domain group.

6. The display substrate of claim 4, wherein a short side of the m-th slit electrode faces a short side of the (m+1)-th interval portion in a boundary between the m-th domain and the (m+1)-th domain.

7. The display substrate of claim 4, wherein a short side of the (m+1)-th slit electrode faces a short side of an (m+2)-th slit electrode in a boundary between the (m+1)-th domain and an (m+2)-th domain.

8. The display substrate of claim 4, wherein a range of an included angle formed by the m-th slit electrode and the (m+1)-th slit electrode is about 60 degrees to about 120.

9. A display device comprising:
a display substrate comprising:
- a switching element formed on a base substrate; and
- a pixel electrode electrically connected to the switching element, the pixel electrode comprising a plurality of slit electrodes that are conductive elements respectively disposed in a plurality of domains oriented substantially parallel to each other and extending substantially in a first direction, the slit electrodes each extending in a direction different from the first direction, wherein each slit electrode is an elongated structure having first and second long sides, and first and second short sides positioned opposite to each other and each extending between the first and second long sides, the first long side oriented at a first angle with respect to the first direction, the second long side oriented at a second angle with respect to the first direction, and the first angle being different from the second angle;

an opposite substrate opposite to the display substrate and comprising a common electrode; and a liquid crystal layer interposed between the display substrate and the opposite substrate.

10. The display device of claim 9, wherein the pixel electrode further comprises a connection electrode disposed in correspondence with a boundary of one of the domains, and connected to one or more of the slit electrodes.

11. The display device of claim 9, wherein the pixel electrode is defined as a plurality of domain groups,
- an m-th domain and an (m+1)-th domain ('m' is an odd number) are included in each of the domain groups,
- an m-th slit electrode and an m-th interval portion defined by the m-th slit electrode are formed on the m-th domain, and
- an (m+1)-th slit electrode extended in a direction different from a direction of the m-th slit electrode and an (m+1)-th interval portion defined by an (m+1)-th slit electrode are formed on the (m+1)-th domain.

12. The display device of claim 11, wherein the slit electrodes disposed on a first domain group of the domain groups is symmetric to the slit electrodes disposed on a second domain group adjacent to the first domain group.

13. The display device of claim 11, wherein a short side of the m-th slit electrode faces a short side of the (m+1)-th interval portion in a boundary between the m-th domain and the (m+1)-th domain.

14. The display device of claim 11, wherein a short side of the (m+1)-th slit electrode faces a short side of an (m+2)-th slit electrode in a boundary between the (m+1)-th domain and an (m+2)-th domain.

* * * * *